(12) United States Patent
Bernhard et al.

(10) Patent No.: US 11,802,963 B2
(45) Date of Patent: Oct. 31, 2023

(54) DISTANCE MEASURING DEVICE

(71) Applicant: LEICA GEOSYSTEMS AG, Heerbrugg (CH)

(72) Inventors: Heinz Bernhard, Berneck (CH); Christian Weis, Scheidegg (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 307 days.

(21) Appl. No.: 17/212,748

(22) Filed: Mar. 25, 2021

(65) Prior Publication Data
US 2021/0302578 A1 Sep. 30, 2021

(30) Foreign Application Priority Data
Mar. 26, 2020 (EP) ..................................... 20166083

(51) Int. Cl.
*G01S 17/42* (2006.01)
*G01C 3/08* (2006.01)
*G01S 7/481* (2006.01)

(52) U.S. Cl.
CPC ................ *G01S 17/42* (2013.01); *G01C 3/08* (2013.01); *G01S 7/4811* (2013.01)

(58) Field of Classification Search
CPC .......... G01S 17/10; G01S 17/08; G01S 17/36; G01S 7/497; G01S 7/4812; G01S 17/32; G01S 17/34; G01S 7/4818; G01S 17/42; G01S 7/499; G01S 7/481; G01S 7/4865; G01S 7/4817; G01S 7/4811; G01S 7/484; G01S 7/4814; G01S 7/4861; G01S 7/487; G01S 17/87; G01S 7/4813; G01S 7/4816; G01S 17/931; G01S 7/4868; G01S 17/89; G01S 7/4815; G01S 17/58; G01S 7/491; G01S 17/66; G01S 17/88; G01S 7/4911; G01S 11/12; G01S 7/4863; G01S 17/14;
(Continued)

(56) References Cited

U.S. PATENT DOCUMENTS 6,343,766 B1 * 2/2002 Livingston ............ G01S 7/4811
244/3.13
2006/0114448 A1 6/2006 Andersson
(Continued)

FOREIGN PATENT DOCUMENTS

| CN | 108427108 B | * | 9/2020 | ........... G01S 7/4812 |
| EP | 2527866 A1 | * | 11/2012 | ............... G01C 3/08 |

OTHER PUBLICATIONS

European Search Report dated Mar. 17, 2020 as received in application No. 20166083.

*Primary Examiner* — Michael P Stafira
(74) *Attorney, Agent, or Firm* — Maschoff Brennan

(57) ABSTRACT

A distance measuring device comprising an optical transmitter channel for transmitting laser light along a transmitter path and an optical reception channel for receiving laser light along a reception path. At least one optical element including a glass part with a coated surface is positioned in the optical transmitter channel or in the optical reception channel. The glass part includes a glass pane with a thickness below 0.3 mm, with a peripheral edge and with a coating on at least one of the two surfaces, and a ring element. The glass pane is adhesively connected to an end face of the ring element. This distance measuring device shows reduced measuring artefacts and/or reduced optical aberration effects and/or a reduced weight.

15 Claims, 3 Drawing Sheets

Figure 1:
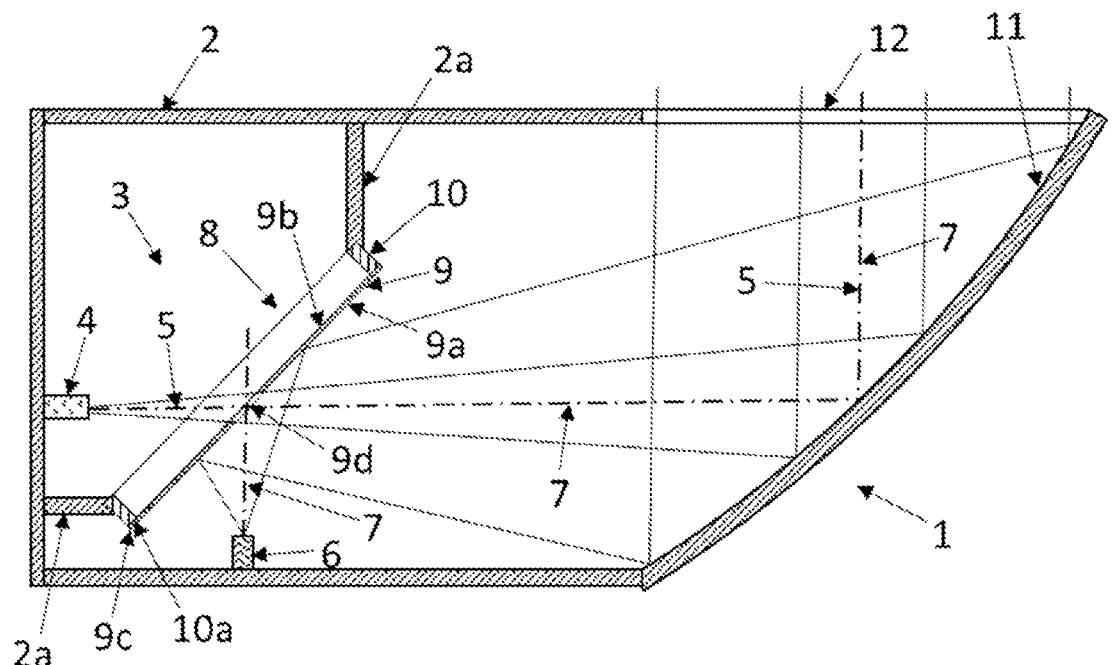

(58) Field of Classification Search
CPC ........ G01S 7/486; G01S 17/48; G01S 7/4808; G01S 7/4915; G01S 17/50; G01S 7/4873; G01S 17/18; G01S 17/894; G01S 17/46; G01S 7/4913; G01S 17/86; G01S 17/26; G01S 7/4876; G01S 7/4912; G01S 7/493; G01S 7/51; G01S 7/483; G01S 7/4802; G01S 7/4916; G01S 7/4917; G01S 13/227; G01S 7/4804; G01S 13/36; G01S 7/4918; G01S 7/4972; G01S 11/14; G01S 13/32; G01S 13/34; G01S 7/4806; G01S 13/40; G01S 13/584; G01S 13/88; G01S 17/933; G01S 2007/4975; G01S 7/03; G01S 17/95; G01S 3/786; G01S 7/4052; G01S 13/10; G01S 13/343; G01S 17/006; G01S 17/02; G01S 17/06; G01S 7/4914; G01S 1/70; G01S 13/08; G01S 15/34; G01S 15/36; G01S 15/89; G01S 17/74; G01S 19/258; G01S 19/37; G01S 19/393; G01S 19/47; G01S 3/08; G01S 5/14; G01S 7/2923; G01S 7/352; G01S 7/48; G01S 7/52022; G01S 13/18; G01S 13/428; G01S 13/526; G01S 13/582; G01S 13/87; G01S 15/08; G01S 17/04; G01S 17/93; G01S 7/00; G01S 7/02; G01S 7/292; G01S 7/489; G01S 7/495; G01C 3/08; G01C 15/002; G01C 3/06; G01C 3/00; G01C 3/32; G01C 15/00; G01C 3/02; G01C 22/00; G01C 1/02; G01C 1/04; G01C 11/025; G01C 15/06; G01C 21/165; G01C 21/20; G01C 21/3629; G01C 21/3679; G01C 1/00; G01C 3/04; G01C 3/085; G01C 3/10

See application file for complete search history.

(56) References Cited

U.S. PATENT DOCUMENTS

| | | | |
|---|---|---|---|
| 2010/0097598 A1* | 4/2010 | Shin | G01S 17/08 356/5.01 |
| 2014/0043464 A1* | 2/2014 | Engel | H04N 7/183 348/94 |
| 2015/0185324 A1* | 7/2015 | Cooper | G01S 17/66 356/4.01 |
| 2018/0335507 A1* | 11/2018 | Shim | G01S 7/4812 |
| 2019/0041515 A1* | 2/2019 | Haruguchi | G01S 17/08 |
| 2019/0079189 A1 | 3/2019 | Weber | |
| 2019/0120960 A1* | 4/2019 | Koga | G01S 7/4817 |
| 2019/0120962 A1* | 4/2019 | Gimpel | G01S 7/4808 |
| 2019/0137626 A1* | 5/2019 | Dietz | B24B 7/228 |

* cited by examiner

DISTANCE MEASURING DEVICE

CROSS-REFERENCE TO RELATED APPLICATIONS

This application claims priority to European Patent Application No. 20166083.4, filed on Mar. 26, 2020. The foregoing patent application are incorporated herein by reference.

FIELD OF INVENTION

The present invention relates to an optical distance measuring device with at least one optical element for guiding laser light of at least one laser beam.

BACKGROUND

Distance measuring devices are built and named according to their fields of application. Examples are geodetic surveying devices such as electronic tachymeters, total stations, multi-stations, or (single beam or multi beam) laser scanners for geodetic or industrial surveying purposes or laser trackers. These devices share the feature that they comprise at least one radiation source for generating a distance measurement beam radiation and optical elements such as lenses or collimators, by means of which the generated measurement radiation can be emitted into free space in a targeting direction toward an object to be surveyed, because of which these devices are also referred to as so-called free beam sensors. A targeting direction and accordingly an emission direction and respectively a reception direction of the measurement beam can be ascertained, for example by means of sensors for angle measurement which are assigned to a deflection mirror or a targeting unit of the system.

The target to be measured is, for example, a surface of a natural object or a target designed especially for surveying purposes, for example, a retroreflector. The irradiated object reflects measurement radiation in a diffuse or oriented manner (particularly retro-reflection), so that at least a part of the measurement radiation is reflected onto the measuring device. The measuring instrument has an optoelectronic sensor, which is designed for the time-resolved and/or location-resolved detection of the measurement radiation, for example, a PIN diode, a CMOS chip, a solid state photomultiplier (e.g. SPADs) or a position-sensitive detector (PSD). The desired measurement variable, the distance value (or a 2D/3D coordinate when combining the distance value with a measured direction), is determined on the basis of the detected measurement radiation. Various measurement principles are available in this case, for example, ranging principles are phase difference measurement, frequency modulated continuous wave (FMCW), runtime measurement (time-of-flight, TOF), or measurement based on the Fizeau principle.

3D laser scanning in particular is a very effective technology for producing millions of spatial measurement points of objects within minutes or seconds. Typical measuring tasks are the recording of objects such as gear wheels, wings, ships, or aircraft, and/or the surfaces thereof or objects such as industrial plants, house façades, or historical buildings, but also accident locations and crime scenes. For this purpose, they have to be capable of sweeping the measuring radiation of an electronic distance measuring device (EDM) over a surface and simultaneously acquiring direction and distance in relation to the measurement point. Thus, such a device has a beam deflection or sweeping unit, by means of which the measuring radiation can be pivoted around at least one axis, usually two axes aligned perpendicularly to one another, for example, a vertical and horizontal axis. The beam deflector can be implemented in the form of a moving mirror or alternatively also by other elements suitable for the controlled angle deflection of optical radiation, for example, rotatable prisms, movable light guides, deformable optical components, etc. Finally, a so-called 3D point cloud is generated from the distance and the direction information correlated therewith for each point by means of data processing.

In general, these devices comprise an optical transmitter channel with a laser emitter unit and an optical reception channel with a laser light detector unit, e.g. as part of a distance measuring module. Laser light emitted by the transmitter channel is at least partly reflected by the object and travels back to the laser light detector unit by the reception channel. Transmitter channel and reception channel can be at least partly identical.

At least one optical element having a glass part is positioned in the distance measuring device such that it is guiding at least a part of the laser light of the optical transmitter channel and/or of the optical reception channel. The optical element can act as a mirror at least for a part of the laser light and/or for a given wave length range and/or for a given polarization of the laser light. If a part of the laser light is reflected and another part of the laser light is passing through the optical element, then the optical element is a beam splitter.

Known distance measuring devices include holding means for holding the glass part of the at least one optical element. The glass part has to have a thickness of at least 1 mm in order to prevent glass breakage. Therefore, the at least one optical element has at least a weight corresponding to the minimal thickness of 1 mm A given minimal weight of an optical element of the distance measuring device causes corresponding requirements on the holding means. Inertia of the optical element and the holding means is limiting accelerating movements, which are e.g. necessary for adjusting optical properties of a respective channel.

An optical element with a glass part with a thickness of at least 1 mm has also negative effects on laser light getting in contact with the surface of the glass part or pathing through the glass part. Laser light scattered at side faces or edges of the glass part or in the glass part can cause measuring artefacts, for example due to short cuts from the optical transmitter channel to the optical reception channel. The glass part can cause light diffraction effects which have to be compensated by added additional optical elements. All one-sided coatings and sometimes even two-sided coatings diminish imaging quality, since the substrate is distorted.

US 2006/0114448 A1 discloses a distance measuring apparatus with optical elements arranged in an optical channel at tilt angles with respect to the optical axis of a laser beam, wherein the optical elements are needed for guiding laser light. Optical aberration effects in the visible channel caused by the optical elements have to be compensated by an additional compensating element. This optical compensating element increases the size and the complexity of the distance measuring apparatus.

BRIEF DESCRIPTION

It is therefore an object of some aspects of the present invention to provide a distance measuring device with reduced measuring artefacts and/or reduced optical aberration effects and/or a reduced complexity and/or reduced weight.

This object is achieved by realizing the features of claim 1. Features which further develop the invention in an alternative or advantageous manner are listed in the dependent patent claims.

The inventive distance measuring device according to some embodiments comprises an optical transmitter channel for transmitting laser light along a transmitter path and an optical reception channel for receiving laser light along a reception path, and at least one optical element including a glass part with a coated surface, whereby for example the coated glass-surface is partially reflecting laser light of the laser beam. The optical element is positioned in the optical transmitter channel and/or in the optical reception channel. The glass part includes a glass pane with a thickness below 0.3 mm, with two surfaces, and with a coating on at least one of the two surfaces, and a ring element. The glass pane is adhesively connected to an end face of the ring element.

In a particular embodiment, the glass pane has a peripheral edge. The ring element may be extending along or adjacent the peripheral edge of the glass pane.

In particular, the ring element is inherently stable which means that the component itself is already robust or rigid against deformation whereas the glass pane itself is fragile but becomes stable after being bonded with the ring element.

Preferred embodiments of the distance measuring device are tachymeters, theodolites, laser scanners, profilers or laser trackers.

A ring element according to the invention can have a circular profile, an oval-shaped profile, an elliptical profile, or a polygonal profile.

In a further preferred embodiment the glass pane has a thickness in the range of 0.03 mm-0.3 mm.

A glass pane with a central or eventually decentral hole can be used in distance measuring devices to let the transmitted laser light of the optical transmitter channel pass through the hole and the returning laser light of the optical reception channel be reflected at a coated reflecting surface of the glass pane around the central hole. Due to the very small thickness of the glass pane around the central hole, there will be a minimized amount of laser light scattered at the glass pane extending around the central hole. There will be no measuring artefacts due to short cuts from the optical transmitter channel to the optical reception channel.

Instead of a glass pane with a central hole, it is possible to use a glass pane where the central area is not or differently coated, e.g. with a polarized coating. The laser light of the optical transmitter channel passing through the uncoated central area of the glass pane will cause no relevant light diffraction effects because of the very small thickness of the glass pane. There will be no measuring artefacts due to short cuts from the optical transmitter channel to the optical reception channel.

In a further preferred embodiment sections of at least one set of a laser light transmitter channel and a laser light reception channel are arranged on the axis of an optical observation channel Glass panes adhesively connected to ring elements are used for coupling the at least one transmitter channel onto the axis of the optical observation channel and for decoupling the at least one reception channel from the optical observation channel Preferably, at least one further glass pane on a ring element is used for separating the at least one reception channel from the corresponding transmission channel.

In a further preferred embodiment at least one glass pane on a ring element is used in a rotating distance measuring module for separating the at least one reception channel from the corresponding transmission channel.

In a further preferred embodiment at least one glass pane on a ring element is used with a rotatable optical element (e.g. in a rotating distance measuring module) as a mirror for reflecting laser light of the transmission channel and of the reception channel. Such a mirror can be provided by a coated glass pane with a plain or a curved surface. A curved surface has in addition to the reflection effect also a focussing effect.

A glass pane with a thickness in the range of 0.03 mm-0.3 mm allows solutions with minimal weight and minimal optical aberrations.

For laser beams with circular cross sections it is advantageous to use glass panes with a peripheral edge of circular form, wherein the diameter of the circular peripheral edge is preferably in the range of 20 mm to 40 mm.

An advantageous ring element has the shape of a cylinder jacket extending around a central cylinder axis. The height in the direction of the cylinder axis and orthogonal to the closed end face, respectively, is preferably in the range of 3 mm to 10 mm and the thickness in a radial direction to the cylinder axis is preferably in the range of 1 mm to 4 mm. In a preferred embodiment, the ring element is made of glass. The ring element may have the same coefficient of expansion as the thin glass pane.

In case the thin glass pane is curved, it is possible to control the radius of the curved thin glass pane over the temperature by different coefficients of expansion of the ring and the thin glass pane.

The ring element with the glass pane is preferably mounted in the distance measuring module with the cylinder axis of the ring element being tilted by an angle of at least 20° in respect of a section of the transmitter path or the reception path at the ring element.

The glass pane is preferably connected to the ring element by a capillary adhesive.

The present invention according to some aspects of the invention provide amongst others the advantage of an improved outcoupling of reflected measuring light without disturbing or influencing the transmitted measuring light, e.g. no shadowing. By spanning a thin glass film or glass foil over a ring element, e.g. a glass ring, there is a very good evenness or flatness, providing a glass plane usable as a mirror. Thereby, the glass foil has substantially no optical effect in the divergent beam path in the transmitter channel, which makes its presence negligible in this respect. For example, in embodiments with a glass plane with a hole (and thus no need for masking of the mirror), there is only minimal scattering, even in case of high beam power, and the divergent diffraction limited emitter light beam remains uninfluenced. Further, even optical images can be decoupled from the optical path.

In addition, some aspects of the present invention allow for better morphologies of a distance measuring device resp. of the optical channels compared to known solutions.

The inventive glass part resp. plane can be manufactured in nearly every form needed—for instance easily adapted to the form of a support carrying the glass part, e.g. a concave mirror—and if applicable, holes can be freely inserted where needed, for example by lasering.

The thin and light weight solution requires considerable less installation space than optical elements according to prior art such as a sealing layer with a hole, beam shaper and a black glass and above that provides improved robustness.

In particular, the reduced weight is advantageous for measuring devices with a rotating optical element resp. fast rotating axis such as laser scanners.

DETAILED DESCRIPTION OF THE DRAWINGS

The distance measuring device according to the invention is described in more detail below, purely in exemplary fashion, on the basis of exemplary embodiments schematically illustrated in the drawings. In the figures, the same and similar elements are denoted by the same reference signs. As a rule, the described embodiments are not illustrated true to scale and should not be construed as restrictions either.

Figure 2:
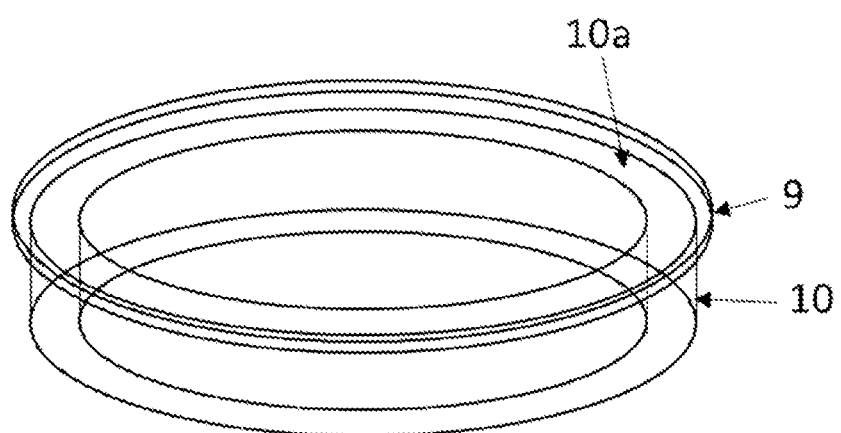
Figure 3:
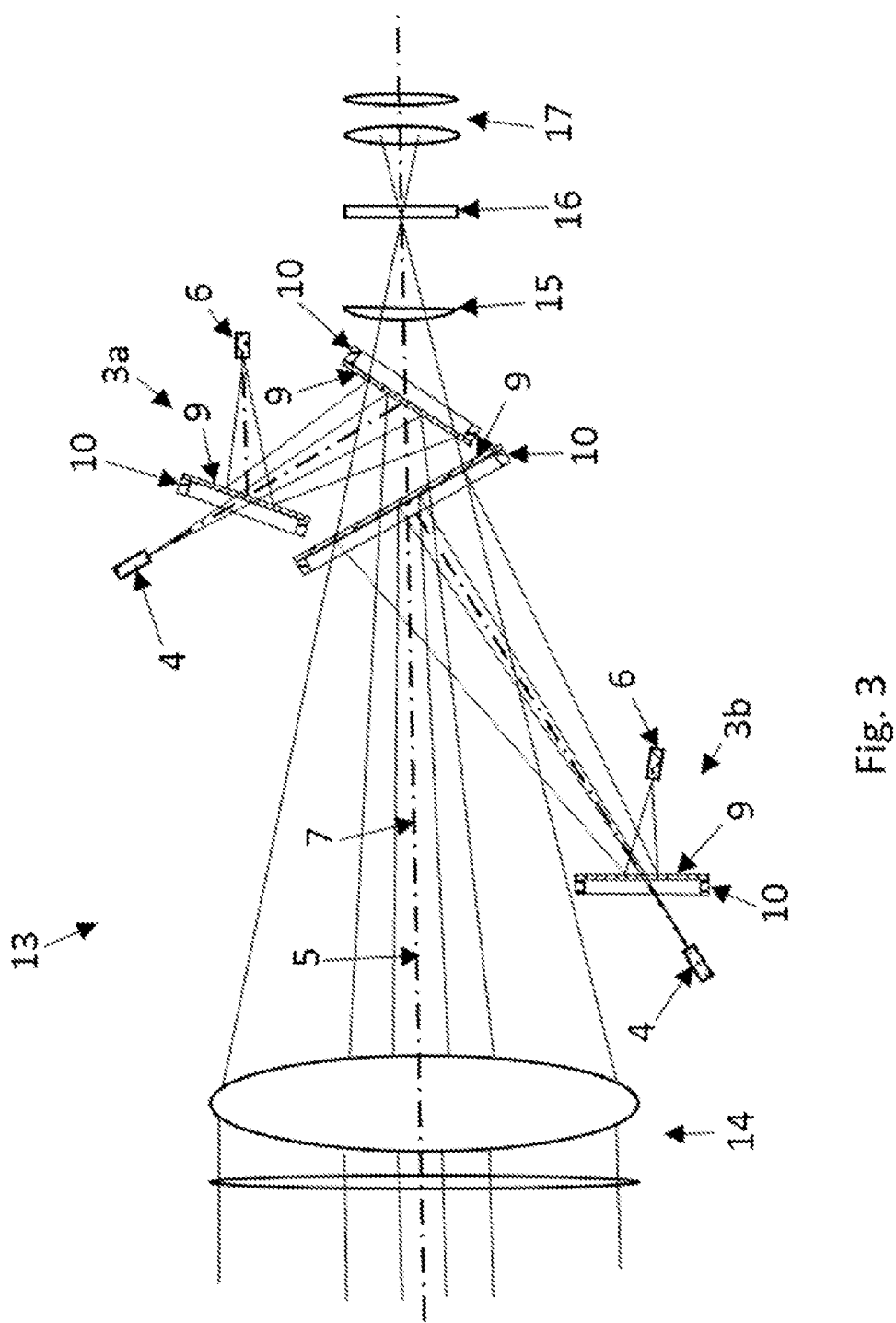
Figure 4:
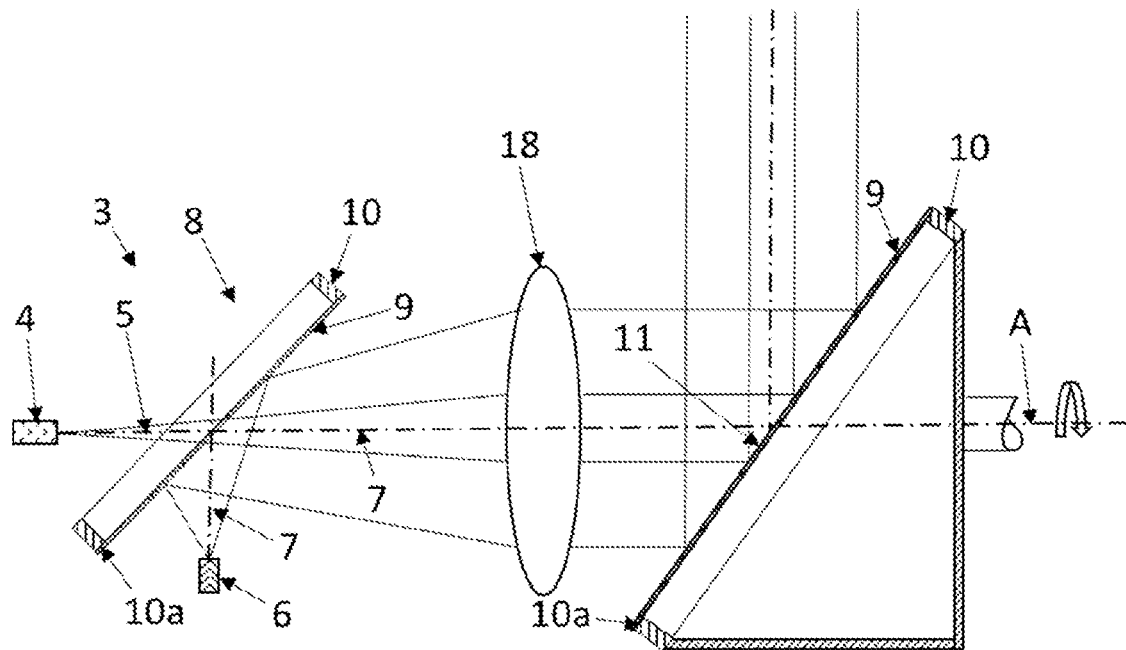
Figure 5:
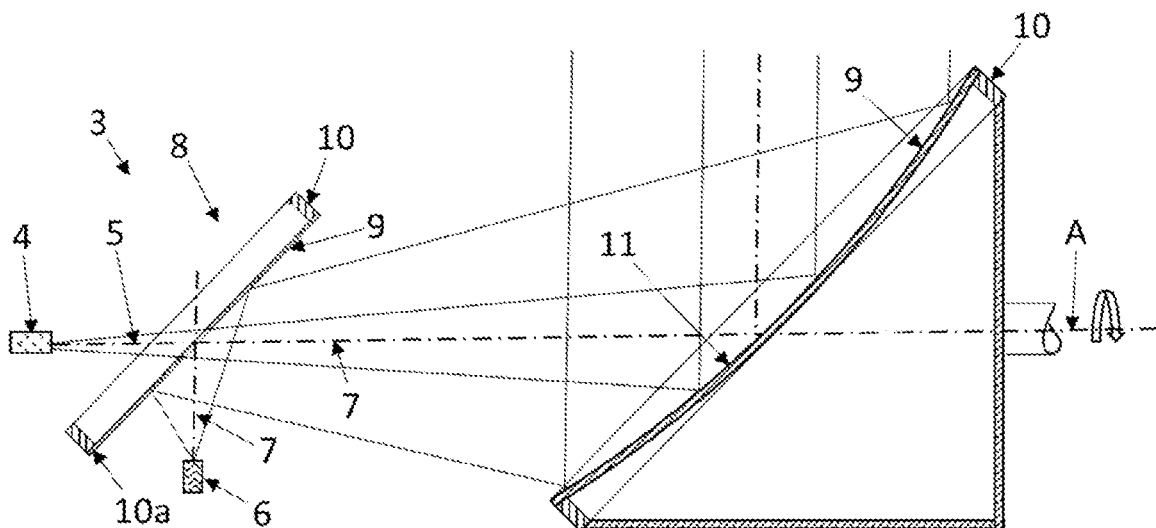

In detail:

FIG. 1 shows a schematic sectional view of a distance measuring device with a part of an optical reception channel being decoupled from an optical transmitter channel, FIG. 2 shows a perspective view of a glass part including a glass pane with a thickness below 0.3 mm and adhesively connected thereto a ring element which is inherently stable and extending along the peripheral edge of the glass pane, FIG. 3 shows a schematic sectional view of an observation device with a laser rangefinder (LRF) including two distance measuring modules, FIG. 4 shows a schematic sectional view of a laser scanner with a plain glass pane, and FIG. 5 shows a schematic sectional view of a laser scanner with a curved glass pane.

DETAILED DESCRIPTION

FIG. 1 shows a distance measuring device 1 with a housing 2. A distance measuring module 3 is arranged in the housing 2 and comprises an optical transmitter 4 for transmitting laser light along a transmitter path 5 and an optical receiver 6 for receiving laser light along a reception path 7. An optical element 8 with a glass part and a coated surface is positioned in the optical transmitter channel 5 and in the optical reception channel 7.

The optical element 8 includes a glass pane 9 with two surfaces 9a, 9b and with a peripheral edge 9c. In the shown embodiment, the surface 9a is coated with a coating which is at least partially reflecting laser light of the optical reception channel 7 and thereby decoupling an end part of the reception channel 7 from a beginning part of the transmitter path 5. The reflection can depend on wave length and/or polarization of the laser light. The laser light of the optical transmitter path 5 is pathing through a central hole 9d in the glass pane 9. The thickness of the glass pane 9 is below 0.3 mm Therefore, the edge of the central hole 9d is very sharp and doesn't scatter laser light toward the optical receiver 6 in such an amount that a significant measurement error could be caused. For very demanding applications, the usage of optical stops, diaphragms or the like is recommended.

A ring element 10 is extending along the peripheral edge 9c of the glass pane 9. The glass pane 9 is adhesively connected to a closed end face 10a of the ring element 10. The ring element 10 is giving the necessary stability to the glass pane 9, similar to the stability of a skin of a drum fixed to a cylindrical body of the drum.

A central cylinder axis of the ring element 10 is tilted by an angle of at least 20°, preferably of 45°, in respect of a section of the transmitter path 5 and a parallel section of the optical reception channel 7. Therefore, laser light of the optical reception channel 7 is reflected by the glass pane 9 in an area around the central hole 9d towards the optical receiver 6. The ring element 10 is hold in the tilted position by holding means 2a, which are fixed to the housing 2.

Laser light of the optical transmitter channel 5 is reflected by a mirror 11 and after this reflection the laser light is leaving the housing 2 by an opening 12. The mirror 11 has a curved shape. Laser light reflected by an object is returning, entering the housing 2 through the opening 12, reflected by mirror 11, reflected by a part of the coated surface of the glass pane 9 and received by the optical receiver 6.

FIG. 2 shows the ring element 10 with the glass pane 9 in a perspective view. The adhesive connection between the glass pane 9 and the ring element 10 is located at an end face of the ring element 10, wherein this end face is ring shaped and closed, respectively. The adhesive connection is closed along the end face of the ring element 10 and along the peripheral edge 9c of the glass pane 9, respectively. It ensures that the thin glass pane 9 stays in a given form, wherein the form can be plain or curved.

FIG. 3 shows a schematic sectional view of an observation device 13 with a laser rangefinder including two distance measuring modules 3a and 3b wherein the wave lengths of the laser light of the two different modules 3a and 3b are different. The observation device 13 has an observation channel for guiding observation light along a central observation direction which corresponds to the transmitter path 5 and the reception path 7 for laser light. Light from the observed area is entering the observation device 13 through a main objective 14. This entered light is passing through two glass panes 9, a focusing lens 15, a plate with crosshairs 16 and an ocular 17 to get to an observer's eye.

In the shown embodiment, the glass panes 9 of both distance measuring modules 3a and 3b are coated with coatings which are at least partially reflecting laser light of one of the measuring modules 3a and 3b, wherein the observation light is passing through the glass panes 9. Both distance measuring modules 3a and 3b have a further glass pane 9 through which the laser light emitted by the optical transmitter 4 is passing and by which the returning laser light of the transmitter path 5 is reflected to the corresponding optical receiver 6.

FIGS. 4 and 5 show schematic sectional views of two laser scanners. The distance measuring module 3 comprises an optical transmitter 4 for transmitting laser light along a transmitter path 5 and an optical receiver 6 for receiving laser light along a reception path 7. An optical element 8 with a coated glass pane 9 and with a ring element 10 are arranged in such a way that emitted laser light is passing the glass pane 9 and laser light returning from an object is reflected by the coated glass pane 9 to the optical receiver 6.

Laser light of the optical transmitter channel 5 and of the optical reception channel 7 is reflected by a mirror 11. The mirror 11 is rotating about a rotation axis A, which is positioned coaxial to a section of the transmitter path 5 extending from the optical transmitter 4 to the mirror 11. The mirror 11 is formed by a coated glass pane 9 with a thickness below 0.3 mm. An inherently stable ring element 10 is extending along the peripheral edge 9c of the glass pane 9. The glass pane 9 is adhesively connected to a closed end face 10a of the ring element 10. The ring element 10 is giving the necessary stability to the glass pane 9.

The embodiment of FIG. 4 includes a lens 18 and a plain mirror 11 or a coated plain glass pane 9, respectively. The embodiment of FIG. 5 has a curved mirror 11 or a curved coated glass pane 9, respectively. Shaping the glass pane 9 and building the adhesive connection between the very thin glass pane 9 and a closed end face 10a of the ring element 10 allows the production of differently shaped at least partially reflecting surfaces which are stable and very light. Low weight allows the production of optical elements with low inertia. Optical elements with low inertia are advantageous when used in distance measuring devices with mirrors or beam splitters to be positioned in different angular directions in high-speed applications.

The invention claimed is:

1. A distance measuring device for performing distance measurement to an object, the distance measuring device comprising:
    an optical transmitter channel for transmitting measuring light along a transmitter path;
    an optical reception channel for receiving measuring light along a reception path; and
    at least one optical element positioned in the optical transmitter channel or in the optical reception channel and having a glass part comprising:
        a glass pane having two surfaces and with a coating on at least one of the two surfaces, the glass pane having a thickness below 0.3 mm, and
        a ring element, an end face of which is adhesively connected to the glass pane.

2. The distance measuring device according to claim 1, wherein the glass pane has a minimum thickness of 0.03 mm.

3. The distance measuring device according to claim 1, wherein the glass pane has a central or a decentral hole.

4. The distance measuring device according to claim 1, wherein the at least one of the two surfaces has a coating comprising a central or decentral area with no or a different coating than the remainder of the at least one of the two surfaces.

5. The distance measuring device according to claim 3, wherein the glass pane is positioned in such a way that the transmitter path passes through the hole.

6. The distance measuring device according claim 1, wherein the glass pane has a peripheral edge having a circular form, preferably wherein the diameter of the circular peripheral edge is in the range of 20 mm to 40 mm.

7. The distance measuring device according to claim 1, wherein the ring element has the shape of a cylinder jacket extending around a central cylinder axis.

8. The distance measuring device according to claim 7, wherein the height of the ring element in the direction of the cylinder axis is in the range of 3 mm to 10 mm and the thickness in a radial direction to the cylinder axis is preferably in the range of 1 mm to 4 mm.

9. The distance measuring device according to claim 7, wherein the cylinder axis of the ring element is tilted by an angle of at least 20°, in respect of a section of the transmitter path or the reception path at the ring element.

10. The distance measuring device according to claim 1, wherein a capillary adhesive connects the glass pane to the end face of the ring element.

11. The distance measuring device according to claim 1, wherein the two surfaces of the glass pane are flat surfaces.

12. The distance measuring device according to claim 1, wherein the two surfaces of the glass pane are curved surfaces.

13. The distance measuring device according to claim 1, wherein the coating is at least partially reflective for the measuring light.

14. The distance measuring device according to claim 1, wherein at least sections of the optical transmitter channel and reception channel are arranged on the axis of an optical observation channel, wherein the glass pane serves for coupling the transmitter channel onto the axis of the optical observation channel and for decoupling the reception channel from the optical observation channel.

15. The distance measuring device according to claim 1, wherein the glass pane serves for separating the optical reception channel from the optical transmission channel.

* * * * *